S. V. SHAROOD.
STEAM TRAP AND AUTOMATIC CHECK VALVE.
APPLICATION FILED MAY 7, 1909.

966,709.

Patented Aug. 9, 1910.

Witnesses

Inventor
S. V. Sharood,
By
Attorneys

UNITED STATES PATENT OFFICE.

SAMUEL V. SHAROOD, OF BROCKTON, MASSACHUSETTS, ASSIGNOR OF ONE-HALF TO EDMUND L. REED, OF EAST BRIDGEWATER, MASSACHUSETTS.

STEAM-TRAP AND AUTOMATIC CHECK-VALVE.

966,709.  Specification of Letters Patent.  Patented Aug. 9, 1910.

Application filed May 7, 1909. Serial No. 494,671.

*To all whom it may concern:*

Be it known that I, SAMUEL V. SHAROOD, a citizen of the United States, residing at Brockton, in the county of Plymouth and State of Massachusetts, have invented certain new and useful Improvements in Steam-Traps and Automatic Check-Valves, of which the following is a specification.

My invention relates to steam traps and check valves adapted to be attached to the cast end of steam pipes for the purpose of preventing the passage of steam, but letting condensed water pass therethrough without waste of steam.

The object of my invention is to provide a device of this character of a very simple construction, which shall be positive in its operation, and which is so constructed that it can be placed in an ordinary valve casing or in a common pipe coupling, and make a cheap, simple and thoroughly efficient automatic check valve.

The invention includes, broadly speaking, a supporting plug or like device which is insertible into the inlet end of any ordinary valve casing or pipe, this plug being formed with a central passage therethrough provided at its ends with a contracted orifice. At the outlet end of the plug or like member, is pivotally supported a check valve which may be either closed by gravity or by means of a spring. This check valve closes against the tapered orifice before referred to, the principle of my invention seeming to be that steam passing into the passage of the plug and through the tapered orifice, will open the check valve for an instant, but will then be dispersed centrifugally causing a central vacuum space which will cause the immediate closing of the valve against the mouth of the orifice, the condensed water from the steam, however, having sufficient body to lift the valve and find an outlet, the valve thus intermittently letting the water out and automatically holding the steam back.

Figure 1:
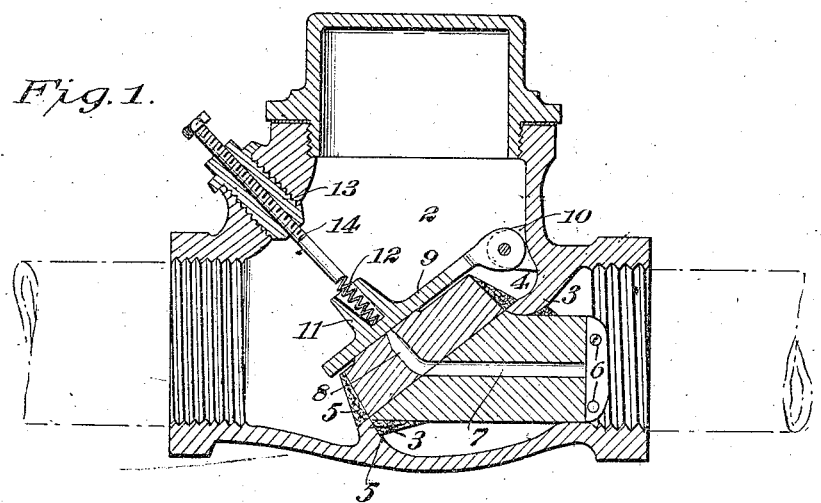
Figure 2:
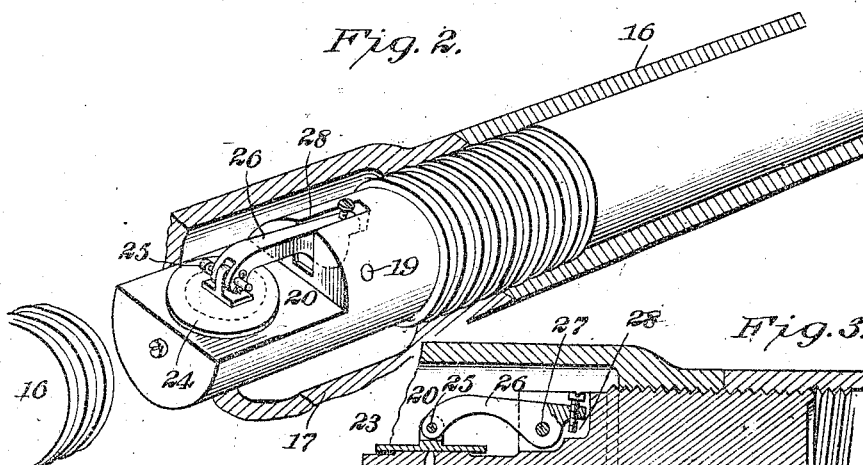
Figure 3:
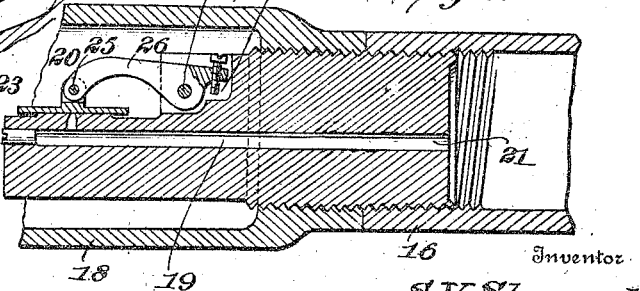

I have shown two embodiments of my invention in the accompanying drawings, and therein:

Figure 1 is a longitudinal section of an ordinary check valve, my valve plug being in place and the valve itself being modified to suit the new conditions; Fig. 2 is a perspective view of the plug, the pipe coupling and pipe connected thereto being broken away; and, Fig. 3 is a longitudinal section thereof.

Corresponding and like parts are referred to in the following description and indicated in all the views of the drawings by the same reference characters.

Referring to Fig. 1, 2 designates a valve casing of any ordinary or preferred construction, screw-threaded at its opposite ends for connection to suitable steam pipes. 3 designates the annular valve seat usually found in these valve casings as placed upon the market. Ordinarily, the swing check valve closes against this seat 3. My invention contemplates, however, the placing of a two-part plug 4 of metal in the inlet end of the valve casing, this plug at its extremity being upwardly inclined so that it may pass through the opening of which the valve seat 3 is the wall, and may be supported thereon. After the plug is in place, it is suitably packed, as at 5, so as to render it steam-tight. Preferably, this plug is made in two parts, the plug being held in position by screws 6 which engage with the wall of the valve casing. The center of the plug is bored with a longitudinal passage 7 which at the upper end of the plug is upwardly turned and is tapered, as at 8, this tapered end of the bore 7 opening upon the face of the plug.

9 designates a check valve which is pivoted in any suitable manner at its upper end. As shown in the drawings, it is pivoted upon ears 10 formed on the valve casing. Preferably, in this form of valve, the valve is held to its seat by the resiliency of a spring. The detailed construction which I have found most effective for this purpose, consists in forming the valve 8 with a socket 11 in which is contained a coil spring 12. Into the opposed side of the valve casing is inserted a screw-threaded bushing 13 which is directed toward the valve. This bushing is also interiorly screw-threaded, and through it passes the screw-threaded rod 14 which device engages with the spring 12.

In Figs. 2 and 3, I have shown another embodiment of my invention. In these figures, 16 designates steam pipes, and 18 an ordinary coupling connecting the two pipes. The plug used in this case and indicated by the numeral 19, is cylindrical and is screw-threaded at its extremity for engagement with the coupling 18 and with the pipe 16.

At its outer end, the plug is cut away, as at 20, to accommodate the valve. A passage 21 passes longitudinally through the plug and is intersected at its outer extremity by a vertical passage 22 having a tapered end opening to the face of the cut-away portion of the plug, this face being provided with a slightly raised hub 23. The valve disk 24 normally rests down upon this hub and closes the orifice of the tapered passage 22. The valve disk is pivotally mounted by a pin 25 upon the end of a pivoted arm 26 which at its rear end is pivoted by a pin 27 in a slot or recess 28 formed in the material of the plug. It will be seen that this method of making a valve of the character described is extremely cheap and simple, and that ordinary pipe couplings and pipes may be used to form the valve casing, the plug alone being different from the constructions already on the market.

The operation of both forms of my invention, is believed to be as follows: In order to explain this operation, I may state that it operates on the same principle that causes a vacuum to be created in the center of a whirling column of air. In other words, the steam passing through the tapered orifice causes a vacuum to be created immediately beneath the valve, which draws the valve down tightly to its seat, the condensed water, however, from the steam having body, lifts the valve to find an outlet. When the valve is lifted, the steam once more performs its work of creating a vacuum and drawing the valve to its seat. Thus, the valve intermittently lets the water out and automatically holds the steam back.

While I believe that this invention operates on the principle above stated, I am not certain that this is so, as I have been unable to determine precisely the reason for the operation of the valve. It is a fact, however, that the valve does operate in the manner specified.

The valve is extremely serviceable for the purpose indicated. It prevents any waste of steam, and yet permits the water of condensation to be excluded. It will be seen that the device is so extremely simple that it may be applied in practically any circumstances and without requiring any special valve casing or any complicated mechanism. There is nothing to get out of order, as the sole moving part consists of the ordinary tapered swing check.

Having thus described the invention, what is claimed as new is:—

1. The combination with an inclosing casing adapted to be connected in a line of pipe and provided with a flat faced valve seat having a passage therethrough formed with a small orifice at its outlet end, of a pivoted check valve of relatively larger area than the area of said orifice adapted to rest upon the face of the seat and close the orifice therethrough.

2. The combination with a casing, of a plug in said casing having a flat valve seat formed on one end thereof, said plug having a longitudinally extending passage therein, the outlet end of the passage being tapered to a small orifice, opening upon the face of the plug, in combination with a pivoted check valve normally resting upon the face of the plug and closing said orifice, said valve having a large area relatively to the area of the orifice.

3. The combination with a valve casing, of a plug filling the bore of the same, said plug having an upwardly presented face, said plug being longitudinally bored to form a passage, the outlet extremity of the passage extending upward and being then formed with a small orifice opening upon the face of the plug, in combination with a pivoted check valve normally resting against the face of the plug, said check valve having a large area relative to the area of the orifice.

4. A valve-carrying plug screw-threaded at one end for insertion into a pipe and having a longitudinally extending passage through its body, said passage at its outlet end being upwardly turned and opening upon a valve seat, the upwardly turned end of the passage terminating in a relatively small orifice, said plug having pivoted thereon, a valve closing against the orificed face of the plug and closing the orifice therethrough, said valve having a large area relative to the area of the orifice.

5. A device of the character described, comprising a cylindrical plug screw-threaded at one end for engagement with a coupling and cut away on its upper side at the other end, the face of said cut-away portion being flat and forming a valve seat, the plug being formed with a longitudinally extending steam passage, the outlet end being upwardly turned and terminating in a relatively small orifice opening upon the flat face of the plug, and a valve adapted to fit against the flat face of the plug and close said orifice, said valve having a projecting arm pivoted to the plug, said valve having a large area relative to the orifice.

6. The combination with a steam pipe and a pipe coupling, of a cylindrical plug screw-threaded at one end for engagement with a coupling and a pipe, the other end of said plug being cut away to form a flat valve seat and said plug being formed with a longitudinally extending steam passage through its body, the end of said passage being upwardly turned and opening upon the flat face of the cut-away portion of the plug, and a disk valve closing against the flat face of the plug and being yieldingly held in this position.

7. A valve plug comprising a body portion formed with a longitudinal passage therethrough, the passage being contracted to form a small orifice opening upon the end face of the body, and a valve disk pivoted to contact with the face of said plug and normally close said orifice, said disk having a large area relative to said orifice.

8. A valve plug comprising an elongated body portion having a longitudinal passage therethrough formed at one end with a contracted termination opening upon the face of the plug, and a disk valve pivoted to the plug and contacting with said face to close said orifice, said valve having a large area relative to the orifice.

9. A device of the character described comprising a body cut away at one end to form a valve seat and having a longitudinal passage extending therethrough, the end of said passage being contracted and terminating upon the face of the seat, an arm pivoted to the body of the plug, and a disk valve pivoted to said arm and contacting with the face of the plug, said valve having a large area relative to the outlet opening of said passage.

In testimony whereof I affix my signature in presence of two witnesses.

SAMUEL V. SHAROOD. [L. S.]

Witnesses:
 EDGAR W. SWIFT,
 ELMER H. FLETCHER.